US010920676B2

(12) United States Patent
Sorato et al.

(10) Patent No.: US 10,920,676 B2
(45) Date of Patent: Feb. 16, 2021

(54) LOW PARTIAL LOAD EMISSION CONTROL FOR GAS TURBINE SYSTEM

(71) Applicant: General Electric Company, Schenectady, NY (US)

(72) Inventors: Sebastiano Sorato, Zurich (CH); Lindsay Dawn Axford, Zurich (CH); Frank Grimm, Baden (CH); Andreas Lechner, Zurich (CH); Adrian Mettler, Chur (CH)

(73) Assignee: General Electric Company, Schenectady, NY (US)

( * ) Notice: Subject to any disclaimer, the term of this patent is extended or adjusted under 35 U.S.C. 154(b) by 790 days.

(21) Appl. No.: 15/353,836

(22) Filed: Nov. 17, 2016

(65) Prior Publication Data

US 2018/0135533 A1  May 17, 2018

(51) Int. Cl.
*F02C 9/28* (2006.01)
*F02C 9/20* (2006.01)
(Continued)

(52) U.S. Cl.
CPC ............... *F02C 9/28* (2013.01); *F02C 7/042* (2013.01); *F02C 9/20* (2013.01); *F02C 9/48* (2013.01);
(Continued)

(58) Field of Classification Search
CPC ...... F02C 9/28; F02C 9/34; F02C 9/40; F02C 9/48; F02C 9/50; F02C 7/22; F02C 7/222;
(Continued)

(56) References Cited

U.S. PATENT DOCUMENTS

| 5,303,542 A * | 4/1994 | Hoffa | F23R 3/26 |
|---|---|---|---|
| | | | 60/746 |
| 7,513,117 B2 * | 4/2009 | Garay | F23R 3/50 |
| | | | 60/772 |

(Continued)

FOREIGN PATENT DOCUMENTS

EP          1533569 A1     5/2005

OTHER PUBLICATIONS

Extended European Search Report and Opinion issued in connection with corresponding EP Application No. 17201029.0 dated Mar. 29, 2018.

*Primary Examiner* — Jason H Duger
(74) *Attorney, Agent, or Firm* — Hoffman Warnick LLC (57) ABSTRACT

A combustor system for a GT system may include: a plurality of burners, each burner including an inflow region for receiving a combustion air flow and a mixing zone disposed downstream of the inflow region for receiving the air flow and a fuel flow; a combustion chamber disposed downstream of the mixing zone; a fuel flow valve system disposed to control the fuel flow to each of the plurality of burners; a combustion sensor configured to determine a combustion parameter; and an exhaust sensor configured to determine an exhaust parameter. A control system may be connected to the combustion sensor, the exhaust sensor and fuel flow valve system. The control system, in response to the gas turbine system operating at a low partial load, redistributes the fuel flow to at least one burner of the plurality of burners as a function of a predetermined emission limit.

17 Claims, 5 Drawing Sheets

(51) Int. Cl.
*F02C 9/48* (2006.01)
*F23R 3/28* (2006.01)
*F02C 7/042* (2006.01)
*F23N 5/02* (2006.01)
*F23N 5/00* (2006.01)
*F23N 1/00* (2006.01)
*F23N 5/24* (2006.01)
*F23N 5/16* (2006.01)

(52) U.S. Cl.
CPC ............... *F23N 1/00* (2013.01); *F23N 5/003* (2013.01); *F23N 5/02* (2013.01); *F23N 5/16* (2013.01); *F23N 5/24* (2013.01); *F23R 3/28* (2013.01); *F23R 3/286* (2013.01); *F05D 2220/32* (2013.01); *F05D 2220/72* (2013.01); *F05D 2270/08* (2013.01); *F23N 2237/02* (2020.01); *F23N 2241/20* (2020.01); *Y02E 20/16* (2013.01)

(58) Field of Classification Search
CPC .. F02C 7/228; F02C 7/232; F23R 3/34; F23R 3/343; F23R 3/346; F23R 3/36; F23R 3/286; F23N 1/00; F23N 5/16; F05D 2270/31
See application file for complete search history.

(56) References Cited

U.S. PATENT DOCUMENTS

| 8,826,670 | B2* | 9/2014 | Hoffmann | F02C 9/22 415/146 |
| 9,285,123 | B2 | 3/2016 | Garay et al. | |
| 2012/0017601 | A1* | 1/2012 | Eroglu | F02C 6/003 60/776 |
| 2012/0122043 | A1* | 5/2012 | Siewert | F02C 7/222 431/12 |
| 2014/0182297 | A1* | 7/2014 | Terry | F02C 9/48 60/773 |
| 2015/0159563 | A1* | 6/2015 | Soni | F23R 3/346 60/773 |
| 2016/0186668 | A1 | 6/2016 | Sorato et al. | |

* cited by examiner

LOW PARTIAL LOAD EMISSION CONTROL FOR GAS TURBINE SYSTEM

BACKGROUND OF THE INVENTION

The disclosure relates generally to gas turbine systems and associated combined cycle power plants (CCPPs), and more particularly, to a combustor system for a gas turbine system employing various structures and control systems to allow maintaining emission compliance during low partial load operation.

Gas turbine systems are used widely to generate power by combusting a fuel and using the hot and pressurized gases to drive a turbine. Gas turbine systems can be combined with steam turbine systems to form a combined cycle power plant (CCPP) system. The gas turbine system and the steam turbine system may collectively drive one or more loads such as a generator(s). The "load" of a power plant system refers to the amount of power it or a part thereof can deliver, and also to the structures that draw that power.

Typically, a gas turbine system is designed for operation at high combined cycle efficiency and low emissions in the upper load range, e.g., 60%-100% of load capacity of the gas turbine system. This configuration provides a high efficiency, high output system for higher loads when the power plant is fully operational. Currently, however, operational flexibility of combined cycle power plants over a larger range of loads is a desirable feature for power plant profitability. One challenge to remaining operational at lower, partial loads (e.g., <50%) is maintaining compliance with emissions limits, e.g., those set by governmental agencies. As a load of a gas turbine system is reduced, certain operational parameters are controlled to reduce the output of the system, e.g., reducing fuel mass delivered to a combustor, airflow intake, etc. Current controls, however, fail to adequately address controlling emissions at low, partial loads. Conventionally, increased emissions at lower loads were acceptable since the power plant was not intended to operate for long durations at these partial loads. Current power plants, however, are called on more frequently to continue operating at low partial loads over a longer period of time, magnifying the emissions control challenge.

BRIEF DESCRIPTION OF THE INVENTION

A first aspect of the disclosure provides a combustor system for a gas turbine system, comprising: a plurality of burners, each burner including an inflow region for receiving a combustion air flow and a mixing zone disposed downstream of the inflow region for receiving the air flow and a fuel flow; a combustion chamber disposed downstream of the mixing zone; a fuel flow valve system disposed to control the fuel flow to each of the plurality of burners; a combustion sensor configured to determine a combustion parameter; an exhaust sensor configured to determine an exhaust parameter; and a control system connected to the combustion sensor, the exhaust sensor and the fuel flow valve system, the control system configured to, in response to the gas turbine system operating at a low partial load, redistribute the fuel flow to at least one burner of the plurality of burners as a function of a predetermined emission limit.

A second aspect of the disclosure provides a control system for a combustor system of a gas turbine system, the control system comprising: a computerized controller operatively coupled to a combustion sensor configured to determine a combustion parameter within a combustion chamber of the combustor system, an exhaust sensor configured to determine an exhaust parameter of exhaust exiting the gas turbine system and a fuel flow valve system disposed to control a fuel flow to each of a plurality of burners of the combustor system, wherein the computerized controller is configured to, in response to the gas turbine system operating at a low partial load, redistribute the fuel flow to at least one burner of the plurality of burners as a function of a predetermined emission limit.

A third aspect of the disclosure provides a combined cycle power plant, comprising: a gas turbine system including a combustor system; a steam turbine system operatively coupled to the gas turbine system; and a control system for the combustor system of the gas turbine system, the control system including: a computerized controller operatively coupled to a combustion sensor configured to determine a combustion parameter within a combustion chamber of the combustor system, an exhaust sensor configured to determine an exhaust parameter of exhaust exiting the gas turbine system and a fuel flow valve system disposed to control a fuel flow to each of a plurality of burners of the combustor system, wherein the computerized controller is configured to, in response to the gas turbine system operating at a low partial load, redistribute the fuel flow to at least one burner of the plurality of burners as a function of a predetermined emission limit.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a combine cycle power plant including a gas turbine system and steam turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Figure 1:
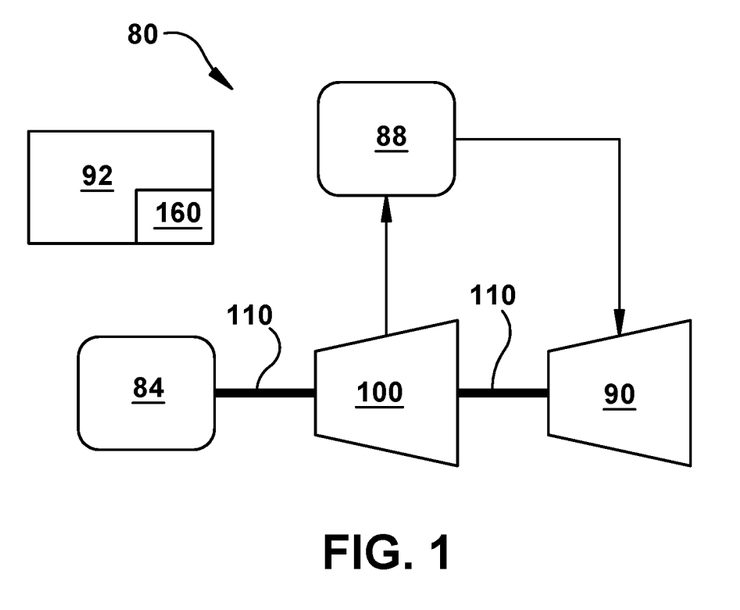
FIG. 1 is a schematic illustration of an illustrative combined cycle power plant.

Turning to FIG. 1, a schematic view of portions of an illustrative combined cycle power plant 80 is shown. Combined cycle power plant 80 may include, for example, a gas turbine system 100 operably connected to a first load device 84. As understood in the art, a "load" of a power plant system refers to the amount of power it or a part thereof can deliver, and also to the structures that draw that power. Load device 84 may include, e.g., a conventional electric generator, a compressor, a pump or another conventional load device that draws power from power plant 80. Load device 84 and gas turbine system 100 may be mechanically coupled by a shaft 110, which may transfer energy between a drive shaft (not shown) of gas turbine system 100 and load device 84. Also shown in FIG. 1 is a heat exchanger 88 operably connected to gas turbine system 100 and a steam turbine system 90. Steam turbine system 90 may include any number of different pressure turbines (not shown). Heat exchanger 88 may be fluidly connected to both gas turbine system 100 and steam turbine system 90 via conventional conduits (numbering omitted). Heat exchanger 88 may be a conventional heat recovery steam generator (HRSG), such as those used in conventional combined cycle power systems. As is known in the art of power generation, heat exchanger 88 may use hot exhaust from gas turbine system 100, combined with a water supply, to create steam which is fed to steam turbine system 90. Steam turbine system 90 may optionally be coupled to a second load device (not shown). In another embodiment, each turbine system 90, 100 may power a separate shaft and a separate load. As understood in the art, a plant control system 92 may be employed to control the various parts of combine cycle power plant 80.

Figure 2:
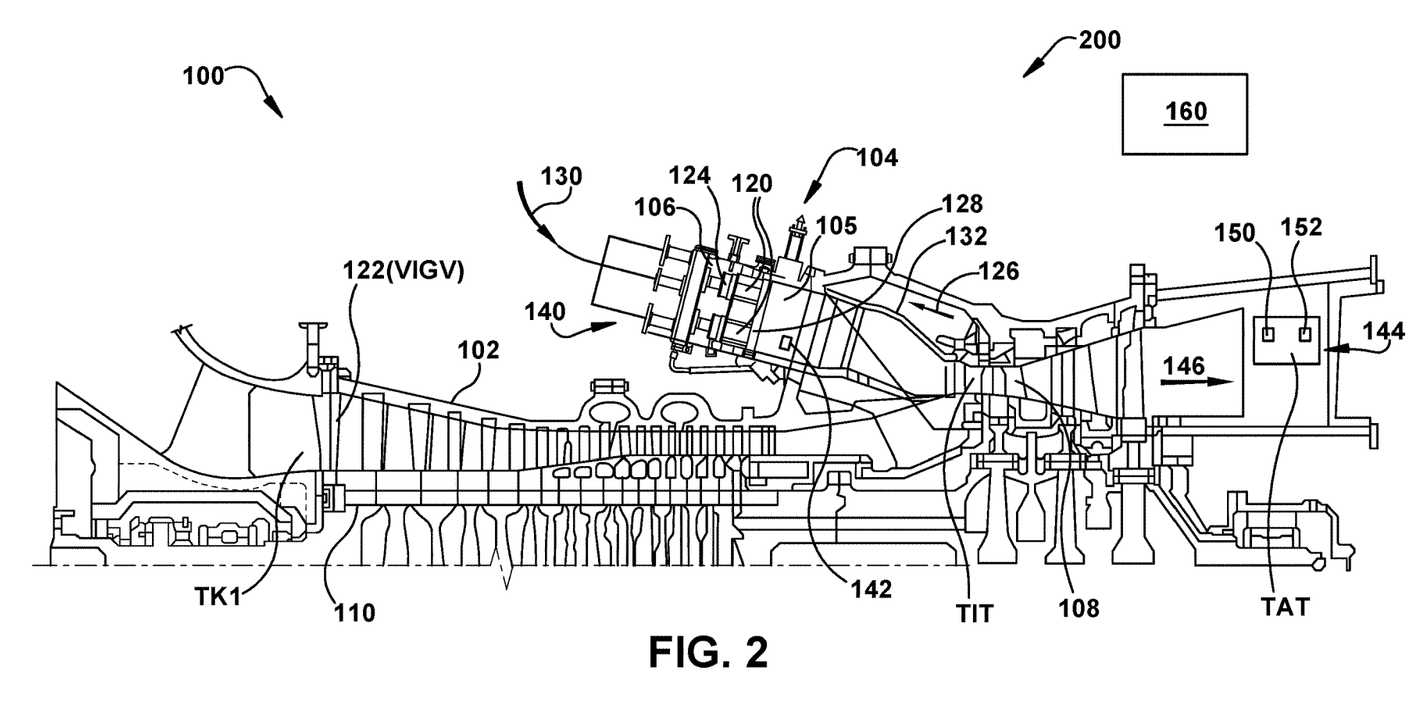
FIG. 2 is a schematic illustration of an illustrative gas turbine system.
Figure 3:
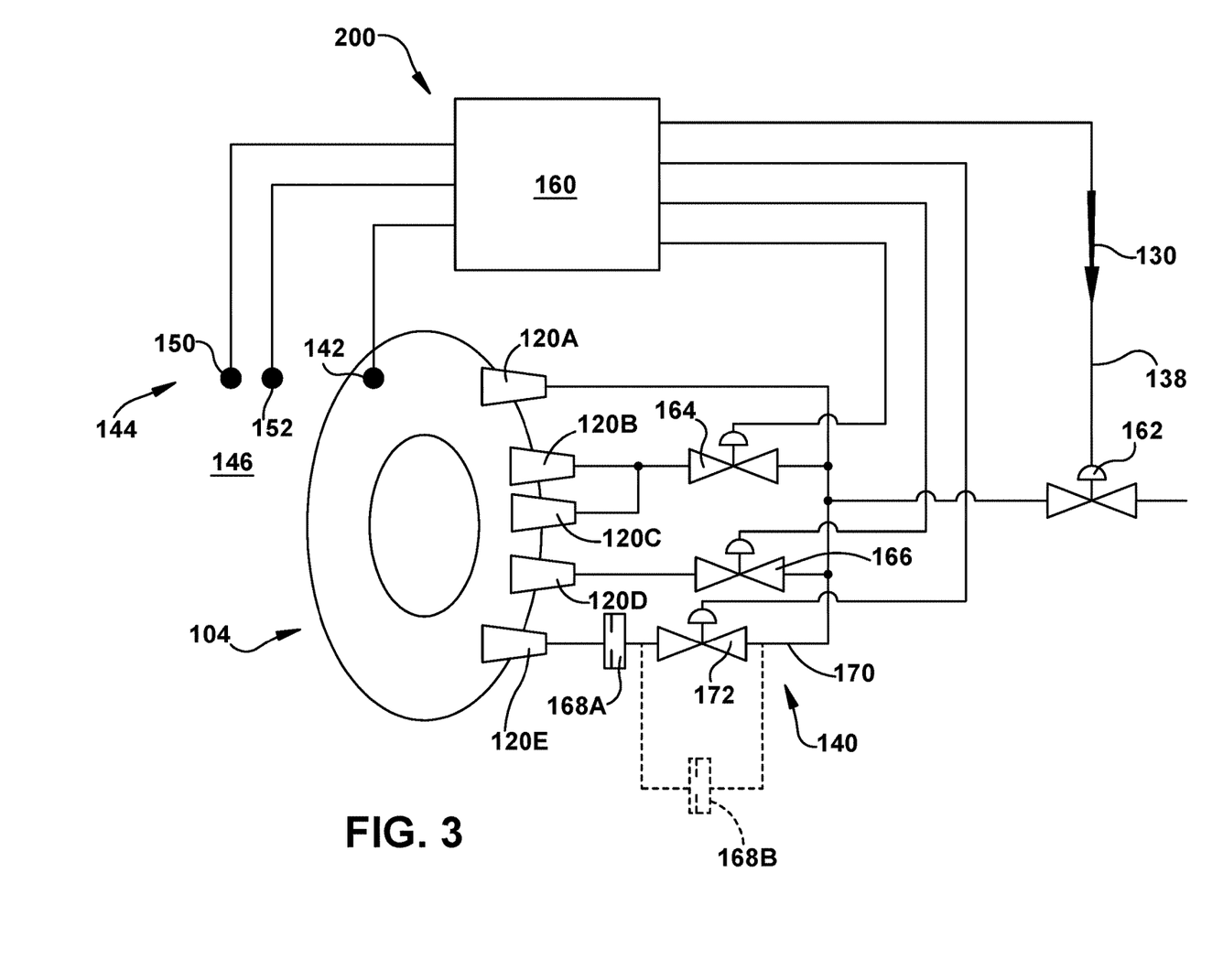
FIG. 3 is a schematic block diagram of a control system and a combustor system according to embodiments of the disclosure.

FIG. 2 shows an enlarged, cross-sectional schematic illustration of an illustrative gas turbine system 100 including generally a compressor 102 and a combustion system 104, and also a control system 160 according to embodiments of the disclosure. FIG. 3 shows a schematic block diagram of combustor system 104 for gas turbine system 100 (FIG. 2), including control system 160 according to embodiments of the disclosure. Control system 160 may include any now known or later developed industrial computerized controller capable of monitoring operational parameters of gas turbine system 100 (FIG. 2) and/or power plant 80 (FIG. 1), and instructing adjustments to parts thereof including but not limited to: variable inlet guide vanes (VIGV) 122 of compressor 102 and a fuel flow valve system 140 (described herein). Combustor system 104 in accordance with embodiments of the disclosure may include a combustion chamber 105 and a fuel nozzle assembly 106, the latter of which includes a plurality of burners 120. In the illustrative embodiment in FIG. 2, a plurality of combustors (each including a number of burners) are disposed in an annular fashion upstream of turbine 108. In FIG. 2, two burners 120 are shown and in FIG. 3, five burners 120A-E are shown. While a particular number of burners are shown in each figure, it is understood that tens or hundreds of burners 120 may be provided in any given combustor system 104 (see e.g., FIG. 5). Each burner 120 may include any now known or later developed burner, and may take different forms such as those commonly referred to as an advanced environmental burner (AEV) or an environmental burner (EV).

As shown in FIG. 2, each burner 120 may include an inflow region 124 for receiving a combustion air flow 126 and a mixing zone 128 disposed downstream of inflow region 124 (just upstream of combustion chamber 105) for receiving the air flow and a fuel flow 130. Air flow 126 may be delivered using a sleeve 132 extending about combustion chamber 105 for delivering air to inflow region 124, e.g., from compressor 102. As noted, combustion chamber 105 is disposed downstream of mixing zone 128 and provides a position in which combustion of the fuel and air occurs. Combustion system 104, as shown in FIG. 2 and in greater detail in FIG. 3, also includes a fuel flow valve system 140 disposed to control fuel flow 130 to each of plurality of burners 120, under control of control system 160, as will be described herein.

Returning to FIG. 2, gas turbine system 100 also includes a turbine 108 and a common compressor/turbine shaft 110 (sometimes referred to as a rotor). In one embodiment, gas turbine system 100 is a MS9001FB engine, sometimes referred to as a 9FB engine, commercially available from General Electric Company, Greenville, S.C. The present disclosure is not limited to any one particular turbine system and may be implanted in connection with other engines including, for example, the GT13E2, MS7001FA (7FA) and MS9001FA (9FA) engine models of General Electric Company.

In operation, air flows through compressor 102 and compressed air is supplied to combustor system 104, via sleeve 132. A volume of flow of air supplied can be controlled, in part, by variable inlet guide vanes (VIGV) 122 on compressor 102. Plurality of burners 120 are in flow communication with combustion chamber 105. Plurality of burners 120 are also in flow communication with a fuel source (not shown in FIG. 1) such that fuel 130 flows to combustion chamber 105, i.e., via nozzles of burners 120. Combustor system 104 ignites and combusts fuel using plurality of burners 120. Combustor system 104 is in flow communication with turbine 108 for which gas stream thermal energy is converted to mechanical rotational energy. Turbine 108 is rotatably coupled to and drives rotor 110. Compressor 102 may also be rotatably coupled to shaft 110.

In accordance with embodiments of the disclosure, control system 160 is provided that is configured to, in response to gas turbine system 100 operating at a low partial load, redistribute the fuel flow 130 to at least one burner of the plurality of burners 120 as a function of a predetermined emission limit. As used herein, a "low partial load" may be any power output level of gas turbine system 104 less than, for example, 50% of capacity. What constitutes low partial load may be user defined based on a number of factors such as but not including the size of the power plant or gas turbine system, the fuel, the geographic environment, etc. As a load of a gas turbine system 100 is reduced, certain operational parameters are conventionally controlled to reduce the output of the system, e.g., reducing fuel mass delivered to a combustor, reducing airflow intake using VIGVs 122 (FIG. 2), etc. As noted, however, current control systems fail to adequately address controlling emissions at these low partial loads. In contrast to conventional systems, control system 160 upon determining gas turbine system 100 is operating at a low partial load, turns off one or more burners 120 or lowers the fuel input to one or more burners 120 in a fashion to maintain certain operational parameters such as output power, but also reduce emissions that could be out of compliance with emissions limits. In general, embodiments of a control system 160 controls combustor staging via burner switch-offs that impact emission reduction. Control system 160 also allow for controlling the required flame temperature, hot gas temperature and combustion behavior. Control system 160 may be implemented as a separate computerized controller system, but in most situations would be implemented as part of a plant control system 92 (FIG. 1) for power plant 80 (FIG. 1), e.g., by modifying code used therein. Control system 160 may be added to a pre-existing plant control system 92 (FIG. 1), added with a replacement plant control system or provided with a new plant control system.

As illustrated, control system 160 includes a number of sensors 142, 144 to measure certain parameters for use in its operation according to embodiments of the disclosure. These sensors 144, 146 are addressed herein with specificity because of their particular relevance to the operation of control system 160. It is emphasized that other operational parameters of gas turbine system 100 are also described herein and that control system 160 may obtain data regarding those operational parameters using any now known or later developed measurement/sensing devices. With regard to sensors 142, 144, a combustion sensor 142 may be configured to determine a combustion parameter within or near combustion chamber 105. A "combustion parameter" as used herein may include any characteristic of the combustion occurring within combustion chamber 105. In one embodiment, the combustion parameter includes a combustor pulsation value. As understood in the art, pulsating combustion is a phenomenon created in devices, such as combustion chamber 105, as a consequence of the interaction between heat release from the combustion and an unsteady flow. Combustion pulsation can be measured in units of milli-bars (mbar), and indicates a steadiness of the combustion occurring within combustion chamber 105. Control system 160 may also include an exhaust sensor 144 configured to determine an exhaust parameter. An "exhaust parameter" as used herein may include any characteristic of an exhaust 146 exiting turbine 108. In one embodiment, the exhaust parameter may include an exhaust temperature (commonly referred to as "temperature after turbine (TAT)") and/or an emission value of turbine 108. Sensor 144 may include a number of sensors 150, 152 such as a sensor 150 for measuring the TAT, e.g., a thermocouple, and a sensor 152 configured to measure the level of the particular type of emission(s) desired. The emission value can include one or more levels of any now known or later developed constituent of exhaust 146 such as but not limited to: nitrogen oxide, carbon dioxide, carbon monoxide, particulates, etc. The emission value is typically of an exhaust 146 constituent for which a predetermined emission limit, such as those promulgated by a government agency, exists. For example, nitrogen oxide may have a predetermined emission limit of 50 mg/Nm$^3$ at 15% $O_2$ (25 ppm at 15% $O_2$). As will be described, the predetermined emission limit may include a number of emission limits for a particular exhaust constituent, or a number of different predetermined emission limits for a number of different exhaust constituents. Each exhaust constituent desired may have its respective emission value measured using an appropriate sensor 152.

Control system 160 may also include modifications to conventional fuel valve systems that deliver fuel to burners 120. In a conventional fuel flow valve system, typically a main control valve controls fuel flow, via various conduits, to all of the individual burners collectively of a given combustor. For example, apart from the modifications to be described herein and also shown in FIG. 3, a main control valve 162 would control fuel flow to all burners 120A-E. In contrast to conventional systems, main control valve 162 controls fuel flow to one or more burners 120A and other downstream flow control structures. As understood, a standard annular combustion chamber may include a plurality of burners including AEV or EV burners connected with two or three gas lines (not all shown for clarity), e.g., a main premix line, a pilot line, and a secondary premix line, and other lines for liquid fuel and NOx water. In the present disclosure, as shown in FIG. 3, a main premix line 138 can be split into additional fuel supply lines (not labeled, but adjacent valves) for allowing installation of control valves/structures, described herein.

As illustrated, fuel flow valve system 140 may include at least one of the following flow control structures to provide further fuel flow control. First, one or more burner group control valves 164 may be provided to control turning off and on a selected group of burners 120. That is, each burner group control valve 164 is disposed, i.e., within fuel supplying conduits, to turn off the fuel flow to a selected group of plurality of burners 120. In FIG. 3, burner group control valve 164 can turn off/on burners 120B and 120C. While one burner group control valve 164 is shown, any number of groups of burners 120 can have fuel supply conduits thereto coupled so as to be controlled by valve 164. The number of burners 120 in a group may be two or more and can be based on any number of factors, e.g., size of gas turbine system, fuel used, geographic environmental factors, emissions level desired, etc.

Second, fuel flow valve system 140 may also include one or more single burner control valves 166 disposed to turn off/on a fuel flow to a corresponding first selected burner, e.g., 120D. That is, each single burner control valve 166 is disposed, i.e., within a respective fuel supplying conduit, to turn off/on the fuel flow to a selected individual burner, e.g., 120D. While one single burner control valve 166 is shown, any number of burners 120 can have their own respective fuel flow controlled by a single burner control valve 166. The number of burners 120 controlled in this fashion can be based on any number of factors, e.g., size of gas turbine system, fuel used, geographic environmental factors, etc.

Finally, fuel flow valve system 140 may also include one or more flow limiters 168 disposed to selectively limit the fuel flow to a corresponding selected burner, e.g., 120E, to a predetermined value from a maximum fuel flow of the corresponding selected burner. For example, if a fuel supply conduit 170 is configured to deliver fuel at a particular flow rate, e.g., 2 liters/minute, flow limiter 168 may be configured to selectively reduce that flow to a predetermined level, e.g., 80%, 70%, 50% or less. Each flow limiter 168 may include a flow orifice device capable of being turned on or off by control system 160. Where a flow limiter 168 is employed, a fuel supply conduit 170 thereto may also include a control valve 172 for operation as a single burner control valve, as described herein. As shown in FIG. 3, in one embodiment shown in solid lines, flow limiter 168A may be in series with control valve 172 such that the options are: a) flow limited to a predetermined level (valve on), or b) no flow (valve off). In alternative embodiment, flow limiter 168A could be removed, and as shown in phantom in FIG. 3, flow limiter 168B may be in parallel with control valve 172 such that options are: a) full flow (valve open), or b) flow limited to a predetermined level (valve closed).

As shown in FIG. 3, control system 160 is connected to combustion sensor 142, exhaust sensor 144 and fuel flow valve system 140, i.e., each control valve 164, 166 and flow limiter 168. Each valve 164, 166, and flow limiter 168 may include any controllable actuator necessary for electronic control thereof, e.g., solenoids, motors, etc., which may be of any format, e.g., pneumatic, hydraulic, electrical, etc.

Figure 4:
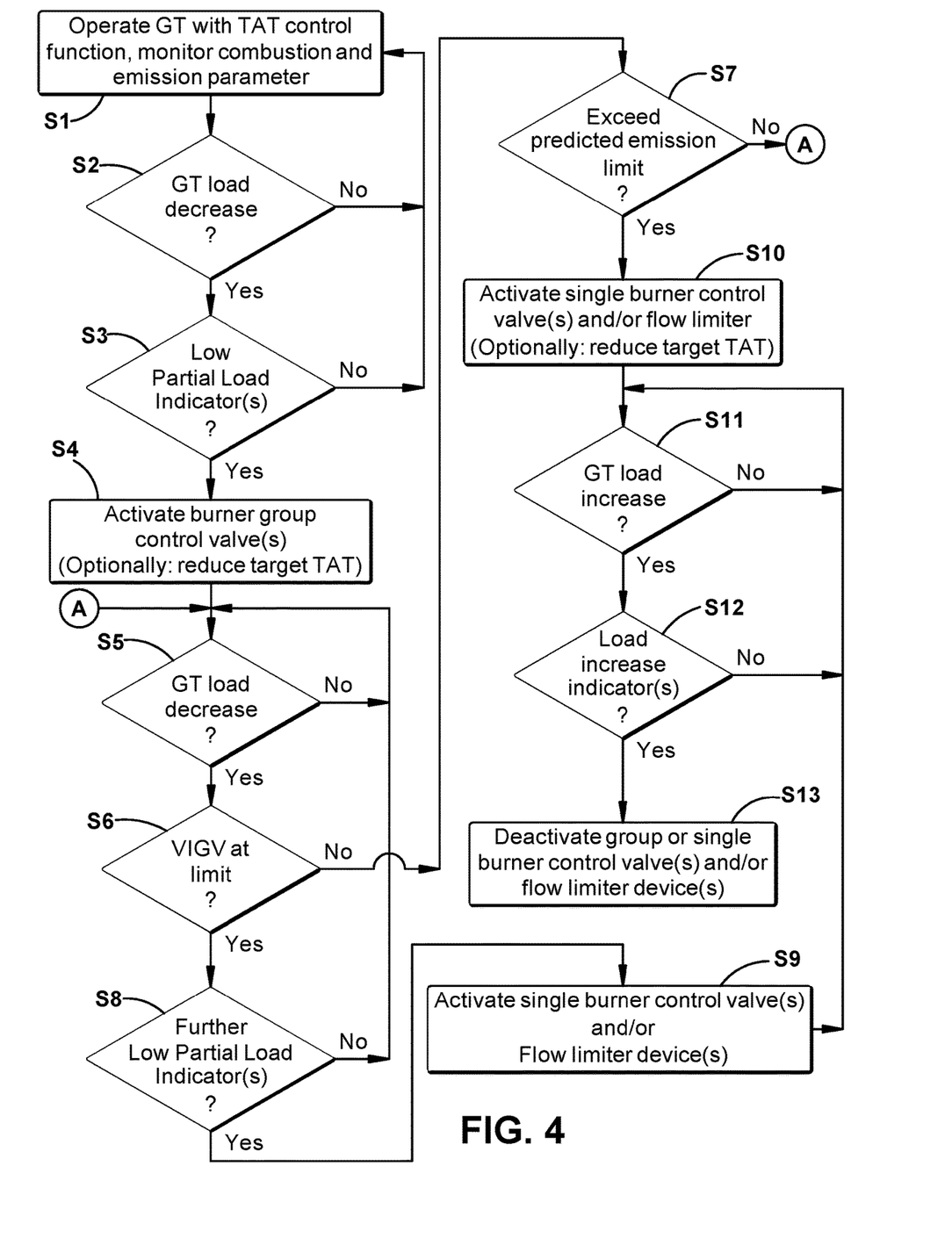
FIG. 4 shows a flow diagram of an operational methodology of the control system of FIG. 3 according to embodiments of the disclosure.
Figure 5:
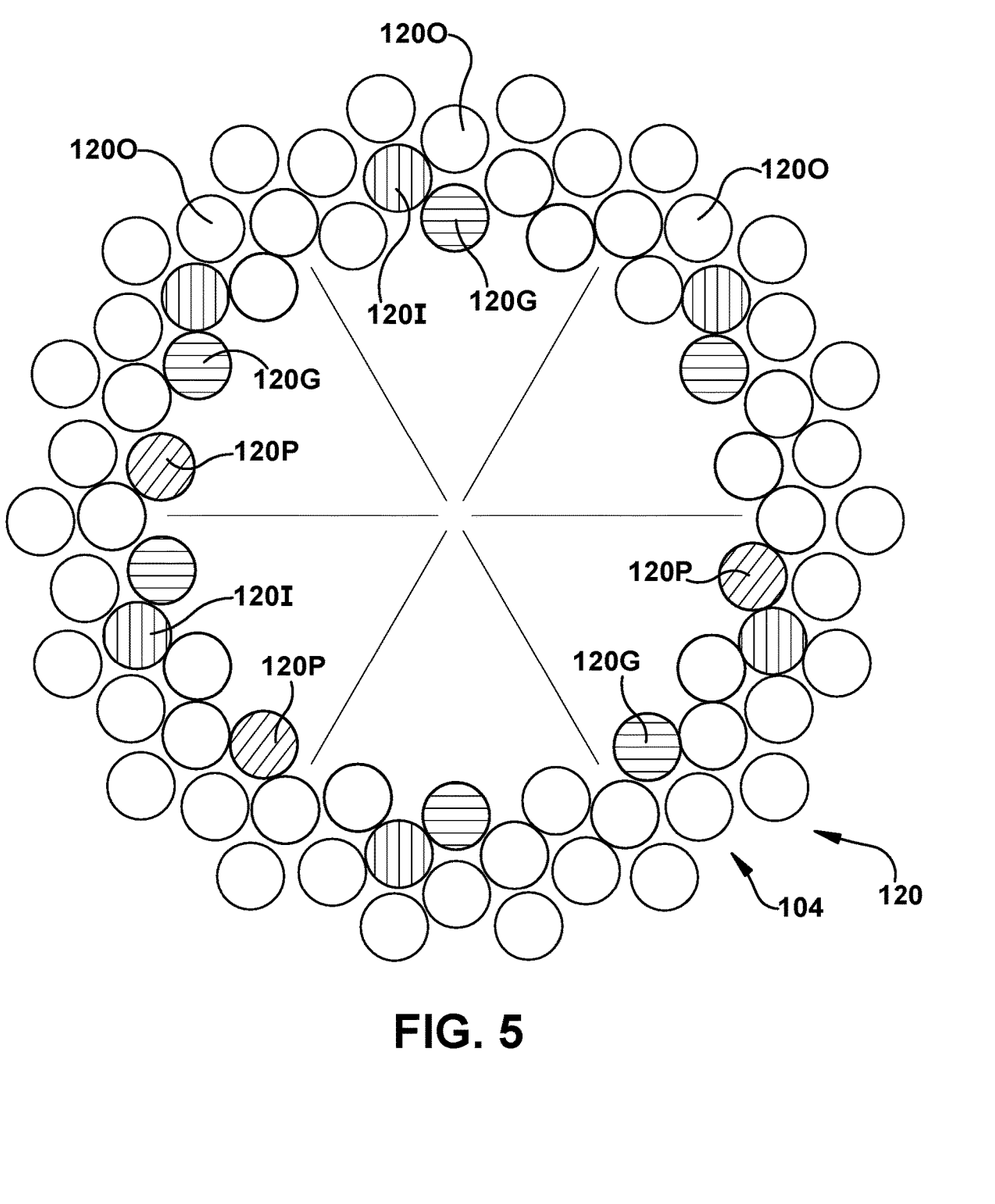
FIG. 5 shows a schematic cross-sectional view of a plurality of burners under control of the control system according to embodiments of the disclosure.

FIG. 4 shows a flow diagram illustrating an operational methodology of control system 160 according to embodiments of the disclosure. As noted, control system 160 is configured to, in response to gas turbine system 100 (FIG. 2) operating at a low partial load, redistribute fuel flow 130 (FIG. 3) to at least one burner 120 of the plurality of burners 120A-E (FIG. 3) as a function of a predetermined emission limit. Control system 160 can be selectively operated as part of plant control system 92, i.e., it can be turned on or off. Where control system 160 is on, it functions as described in FIG. 4, and if it is off, whatever normal controls plant power system 92 uses are operational, e.g., under control of a TAT control function described herein. FIG. 5 shows a schematic, cross-sectional views of a plurality of burners 120 of an illustrative combustor system 104. In FIG. 5, the operational states of each burner is indicated with different shading: white indicates always operational (fuel flow on) 120O; diagonal cross-hatching indicates operational but flow limited (flow limiter 168 (FIG. 3) activated) 120P; horizontal cross-hatching indicates inoperative (fuel flow off) by way of one or more burner group control valve 164 (FIG. 3) 120G; and vertical cross-hatching indicates inoperative (fuel flow off) by way of one or more single burner control valve 166 (FIG. 3) 120I.

With reference to FIG. 4, and also FIGS. 3 and 5, in a first step S1, control system 160 controls fuel flow 130 to at least one burner 120 as a function of a (conventional) temperature after turbine (TAT) control function that controls a temperature after turbine (TAT), i.e., at sensor 150. (Note, FIG. 2 shows illustrative locations at which certain parameters used in the operation of control system 160 may be determined.) TAT control functions are common mechanisms to control operation of a gas turbine system 100 (FIG. 2) based on a calculated TAT of the system, i.e., during all load conditions. The TAT control function may be responsive to at least one of: a turbine inlet temperature (TIT), a compressor inlet temperature of a compressor of the gas turbine system (TK1), and a variable inlet guide vane (VIGV) 122 position that controls the air flow from compressor 102. That is, those parameters are constantly measured, and based on those parameters, and perhaps other parameters, control system 160 can control gas turbine system 100, and hence the TAT. Turbine inlet temperature (TIT) may be calculated/measured in a couple of different manners, for example, as a combustion flame temperature in combustion chamber 105, or a hot gas temperature (THG) of the gas exiting combustion chamber 105 upstream of turbine 108. In order to control the TAT, control system 160 may control structures such as but not limited to: a pump (not shown) that controls overall fuel flow, VIGV 122 (FIG. 2) position to control air intake, etc. The TAT control function remains functional during operations of control system 160 according to embodiments of the disclosure. In accordance with embodiments of the disclosure, control system 160 uses sensors 142 and 144 (FIGS. 2 and 3) to measure the combustion parameter and the exhaust parameter, respectively.

As noted herein, predetermined emission limit may include a number of emission limits for a particular exhaust constituent, e.g., carbon monoxide (CO), or a number of different predetermined emission limits for a number of different exhaust constituents, e.g., NOx, CO and carbon dioxide ($CO_2$). In one embodiment, predetermined emission limit includes a first emission limit and a second emission limit, i.e., either for different exhaust constituents or for the same exhaust constituent.

In step S2, control system 160 determines whether gas turbine system 100 load is decreasing, i.e., output load is decreasing. The load is determinable by measuring the power output of the gas turbine system 100 in a conventional manner. If not, i.e., no at step S2, control system 160 returns to step S1 and operations continue as usual. In contrast, if the load is decreasing, i.e., yes at step S2, at step S3, control system 160 determines whether a low partial load situation exists warranting activation of aspects of fuel valve system 140 according to embodiments of the disclosure. To this end, control system 160 may determine whether the decreased load causes at least one of the following low partial load indicators: First, a turbine inlet temperature (TIT) (FIG. 2) decreasing to a first TIT set point. The first TIT set point can be selected, for example, as a temperature for a particular fuel indicative of a situation that would cause an emission value to rise, e.g., a lower than expected temperature for a fuel indicative incomplete combustion. The TIT can be selected on a variety of alternative bases. Second, the combustor pulsation value, i.e., combustor parameter, increasing to a first pulsation set point. For example, the pulsation set point may be 200 mbar. In this case, the combustor pulsation value increasing may indicate an unsteady combustion, which may lead to rise in the emission value beyond an emission limit. Finally, the actual emission value measured by sensor 152 may exceed a first emission limit. In this case, the first emission limit may indicate an emission value for a particular exhaust constituent that is either getting too high, or is actually out of compliance with a proscribed value. For example, nitrogen oxide may be approaching a proscribe limit of 100 ppm or exceed it.

If one or more of low partial load violations does not exist, i.e., no at step S3, flow returns to step S1. In contrast, if one or more of the low partial load violations exist, i.e., yes at step S3, at step S4, control system 160 activates at least one of the at least one burner group control valve 164 (FIG. 3) to turn off fuel flow 130 to a selected group of the plurality of burners 120. FIG. 5 shows activation of one or more burner group control valves 164 (FIG. 3) to turn off a selected group of burners 120G, i.e., those with horizontal cross-hatching. With a selected group of burners 120G turned off, combustor 104 combustion proceeds in a manner to address the low partial load violation(s) that indicate a potential violation of a predetermined emission limit. Consequently, gas turbine system 100 operation proceeds to either remove the non-compliant emission value or reduce the likelihood of non-compliance, while also allowing gas turbine system 100 to operate at other desired operational parameters, e.g., low partial load, firing temperature, TAT.

At step S4, as an optional step, in further response to the load of gas turbine system 100 decreasing, i.e., yes at step S3, and the causing of at least one of above-described low partial load violations, control system 160 may adjust a target temperature after turbine (TAT) of the TAT control function. In this fashion, the overriding control of gas turbine system 100 made possible by the TAT control function does not impact the benefits of switching off the selected group of burners 120G.

In steps S5 and S6, control system 160 determines whether the load of gas turbine system 100 continues to decrease, and if so (yes at S5), at step S6, determines whether VIGV 122 (FIG. 2) position is reaching an adjustment limit, i.e., a point at which no additional air can be reduced to increase the combustion of fuel in combustion chamber 105. If the load is not decreasing, i.e., no at S5, operation continues to monitor the load, repeating step S5. In response to the load of the gas turbine system further decreasing, i.e., yes at step S5, at step S6, control system 150 determines whether VIGV 122 (FIG. 2) position has reached an adjustment limit. VIGV 122 position can be determined using any now know nor later developed position sensors on VIGVs 122. During operation under control of the TAT control function, control system 160 will adjust VIGVs 122 (FIG. 2) to allow in more or less air to control the combustion. Where VIGVs 122 (FIG. 2) are at an adjustment limit, however, no further air flow control is available using the TAT control function. If VIGV 122 (FIG. 2) has not reached an adjustment limit, i.e., no at step S6, control system 160 proceeds to step S7, which addresses the situation in which VIGVs 122 (FIG. 2) position is not at an adjustment limit, but the predetermined emission limit is exceeded. In contrast, if VIGV 122 (FIG. 2) has reached an adjustment limit, i.e., yes at step S6, no further control of the combustion can be made using VIGVs 122 (FIG. 2). In this case, control system 160 determines whether the situation causes at least one further low partial load violation, each of which indicate potential issues relative to the predetermined emission limit that may be addressed through changes to fuel flow valve system 140 (FIG. 3). More specifically, at step S8, control system 160 determines whether the situation causes at least one of the following further low partial load violations: First, TIT decreases to a second TIT set point. As with the first TIT set point, the second TIT set point can be selected, for example, as a temperature for a particular fuel indicative of a situation that would cause an emission value to rise, e.g., a lower than expected temperature for a fuel indicative of incomplete combustion. The second TIT set point can be the same as or different than the first TIT set point. As noted, the TIT can be selected on a variety of alternative bases. Second, another further low partial load indicator may include the combustor pulsation value, i.e., combustor parameter, increasing to a second pulsation set point. Here again, the combustor pulsation value increasing may indicate a further unsteady combustion, which may lead to rise in the emission value beyond an emission limit. Finally, another further low partial load indicator may include the actual emission value measured by sensor 152 exceeding a second emission limit. In this case, the first emission limit may indicate an emission value for a particular exhaust constituent that is getting too high, and the second emission limit may indicate an emission value for a particular exhaust constituent that is higher than first emission limit or is actually out of compliance with a proscribed value. For example, nitrogen oxide may be exceeding a proscribe limit of 100 ppm.

If one or more of the further low partial load violations does not exist, i.e., no at step S8, flow returns to step S5. In contrast, if one or more of the further low partial load violations exist, i.e., yes at step S8, at step S9, control system 160 activates at least one of: the at least one single burner control valve 166 (FIG. 3) to turn off fuel flow 130 to the corresponding first selected burner 120D (FIG. 3), and the at least one flow limiter 168 (FIG. 3) to limit fuel flow 130 to a corresponding second selected burner 120E (FIG. 3) to the predetermined value from the maximum fuel flow. FIG. 5 shows activation of one or more single burner control valves 166 (FIG. 3) to turn off a burner 120I. A number of single burners 120I, i.e., those with vertical cross-hatching, are shown shut off in FIG. 5. Further FIG. 5 shows activation of at least one flow limiter 168 (FIG. 3) to limit fuel flow 130 to a corresponding second selected burner 120P to the predetermined value from the maximum fuel flow. At step S9, any number of individual burners 120I can be turned off and/or any number of flow limiters 168 (FIG. 3) activated to address the emission condition, e.g., increasing number of valves 166 can be turned off and/or an increasing number of flow limiters activated in a sequential manner until improvement in one or more of the further low partial load indicators occurs. In any event, with additional burner(s) 120I turned off and/or additional burners 120P having limited fuel supplied thereto, combustor 104 combustion proceeds in a manner to address the further low partial load violation(s) that indicate a potential violation of a predetermined emission limit. Consequently, gas turbine system 100 operation proceeds to either remove the non-compliant emission value or reduce the likelihood of non-compliance, while also allowing gas turbine system 100 to operate at other desired operational parameters, e.g., low partial load, firing temperature, TAT, etc. After step S9, operation proceeds to step S11, described later herein.

Returning to step S7, in response to control system 160 determining VIGV 122 (FIG. 2) position is not reaching an adjustment limit, i.e., no at step S6, at step S7, control system 160 determines whether the situation causes the emission value to exceed the predetermined emission limit. As noted, during operation under control of the TAT control function, control system 160 will adjust VIGVs 122 (FIG. 2) to allow in more or less air to control the combustion. Where VIGVs 122 (FIG. 2) are at an adjustment limit, however, no further air flow control is available. Step S7 addresses the situation in which VIGVs 122 (FIG. 2) position is not at an adjustment limit, but the predetermined emission limit is exceeded. If control system 160 determines the emission value (from sensor 152 (FIG. 3) exceeds the predetermined emission limit, i.e., yes at step S7, at step S10, control system 160 activates at least one of: the at least one single burner control valve 166 (FIG. 3) to turn off the fuel flow to the corresponding first selected burner 120I (FIG. 5), and the at least one flow limiter 168 (FIG. 3) to limit the fuel flow to the corresponding second selected burner 120P (FIG. 5) to the predetermined value from the maximum fuel flow. This process is identical to that described relative to step S9. In addition, with additional burner(s) 120I turned off and/or additional burners 120P having limited fuel supplied thereto, combustor 104 combustion proceeds in a manner to address the further low partial load violation(s) that indicate a potential violation of a predetermined emission limit even though VIGV 122 (FIG. 2) has not reached a maximum airflow limit. Consequently, gas turbine system 100 operation proceeds to either remove the non-compliant emission value or reduce the likelihood of non-compliance, while also allow gas turbine system 100 to operate at other desired operational parameters, e.g., low partial load, firing temperature, TAT, etc. As an optional process at step S10, control system 160 may adjust a target temperature after turbine (TAT) of the TAT control function. In this fashion, the overriding control of gas turbine system 100 made possible by the TAT control function does not impact the benefits of switching off or flow limiting the individual burners 120I, 120P. If control system 160 determines the emission value (from sensor 152 (FIG. 3) does not exceed the predetermined emission limit, i.e., no at step S7, operation returns to step S5, and the gas turbine is monitored for a decreasing load.

In steps S4, S9 and S10, control system 160 may select burners to switch-off in order to have a TIT distribution that maintains turbine blade dynamics (blade excitation) at same level of standard operation. That is, control system 160 selects burners to turn off to maintain operation of turbine 108 at the same standard operation as if it was not operating at low partial load.

In step S11, control system 160 determines whether the load of gas turbine system 100 (FIG. 2) is increasing. If no at step S11, control system 160 operation continues to monitor for a load increase, i.e., it repeats step S11. If yes at step S11, at step S12, control system 160 determines whether the load increase causes at least one of the following load increasing indicators: TIT increasing to exceed the first TIT set point, TIT increasing to exceed the second TIT set point, the combustor pulsation value decreasing to below the first pulsation set point, the combustor pulsation value decreasing to below the second pulsation set point, the emission value decreasing to below the first emission limit, or the emission value decreasing to below the second emission limit. Control system 160 may require certain combinations of the afore-mentioned load increasing indicators to exist, also. In response to one or more of the load increasing indicators existing, yes at step S12, indicating gas turbine system 100 (FIG. 2) may have a load output increasing, at step S13, control system 160 may deactivate at least one of the following: First, control system 160 may turn on the at least one burner group control valve 164 (FIG. 3) to turn on fuel flow 130 to the at least one selected group of the plurality of burners 120G (FIG. 5). Second, control system 160 may deactivate the at least one single burner control valve 166 (FIG. 3) to turn on the fuel flow to the corresponding first selected burner 120I (FIG. 5). Finally, control system 160 may deactivate the at least one flow limiter 168 (FIG. 3) to not limit the fuel flow 130 to the corresponding second selected burner 120P (FIG. 5). Control system 160 may deactivate, i.e., allow increased fuel flow 130, of any combination of the afore-mentioned fuel flow valve system 140 (FIG. 3) components based on the impact to such operation parameters including but not limited to: firing temperature, load, emission value, combustor dynamic, etc.

In response to one or more of the load increasing indicators not existing, no at step S12, processing returns to step S11.

At the end of step S13, operation may return to step S1. It is emphasized that step S1 continues throughout operation of control system 160, as described herein, i.e., TAT control functions during the burner adjusting operations described herein.

Embodiments of the disclosure improve operational flexibility of gas turbine system 100 by allowing control of the proper combination of combustion flame temperature and TIT (turbine inlet temperature) required to be emission compliant and have stable combustion behavior in low partial load conditions. As noted, operating at low partial load is a desired feature for power plant operators. An advanced control concept, as described herein, ensures reliability and availability while operating closer to boundaries and maximizing power plant profitability during low partial load operation, e.g., down to 10% load. Embodiments of the present disclosure are applicable to all annular combustor gas turbine systems with individual burners, but also applicable to can-combustor or other systems.

Control system 160 maintains the required combination of combustion flame temperature, combustor flame stability and turbine inlet temperature during low partial load operation, making the gas turbine system emission compliant in the low partial load, e.g., down to 10% load. Also, control system 160 enables control of the turbine inlet temperature during "temperature after turbine" (TAT) limit operation, via conventional TAT control functions (e.g., TAT average control), in combination with the burner switch-off concept. Further, control system 160 integrates TIT control via TAT control functions using the existing control logic parameters, and allows for the reduction of fuel consumption at minimum load conditions. Control system 160 is applicable to both new development and retrofit applications.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A combustor system for a gas turbine system, comprising:
   a plurality of burners, each burner of the plurality of burners including an inflow region for receiving a combustion air flow and a corresponding mixing zone disposed downstream of the inflow region for receiving the air flow and a fuel flow;
   a combustion chamber disposed downstream of the corresponding mixing zone of each burner of the plurality of burners;
   a fuel flow vale system disposed to control the fuel flow received in the corresponding mixing zone of each burner of the plurality of burners;
   a combustion sensor configured to determine a combustion parameter;
   an exhaust sensor configured to determine an exhaust parameter; and
   a control system operatively coupled to the combustion sensor, the exhaust sensor and the fuel flow valve system, the control system configured to, in response to a load of the gas turbine system decreasing, perform a redistribution of the fuel flow received in the corresponding mixing zone of at least one burner of the plurality of burners as a function of a predetermined emission limit,
   wherein the fuel flow vale system includes:
   a first flow control structure that includes at least one burner group control valve, the at least one burner group control vale disposed to turn off the fuel flow received in the corresponding mixing zones of a selected group of the plurality of burners in order to perform the redistribution;
   a second flow control structure that includes a first single burner control valve, the first single burner control valve disposed to turn off the fuel flow received in the corresponding mixing zone of a first selected single burner of the plurality of burners in order to perform the redistribution; and
   a third flow control structure that includes a second single burner control valve operatively coupled to a flow limiter, the flow limiter disposed to selectively limit the fuel flow received in the corresponding mixing zone of a second selected single burner of the plurality of burners to a predetermined value in order to perform the redistribution, and
   wherein the first single burner control valve is not operatively coupled to the flow limiter.

2. The combustor system of claim 1, wherein the combustion parameter includes a combustor pulsation value, and the exhaust parameter includes at least one of: a temperature after turbine (TAT) and an emission value of the gas turbine system.

3. The combustor system of claim 1, wherein the control system controls the fuel flow received in the corresponding mixing zone of the at least one burner as a function of a temperature after turbine control function that controls a temperature after turbine (TAT),
   wherein the temperature after turbine control function is responsive to at least one of: a turbine inlet temperature (TIT), a compressor inlet temperature of a compressor of the gas turbine system (TK1), and a variable inlet guide vane (VIGV) position that controls an air flow from the compressor.

4. The combustor system of claim 1, wherein the predetermined emission limit includes a first emission limit and a second emission limit, and
   wherein the control system is configured to, in response to the load of the gas turbine system decreasing to a first partial load, activate the at least one burner group control valve, wherein the load decreasing to the first partial load causes at least one of the following:
   a turbine inlet temperature (TIT) decreasing to a first TIT set point,
   a combustor pulsation value increasing to a first pulsation set point, or
   an emission value of the gas turbine system exceeding the first emission limit.

5. The combustor system of claim 4, wherein the control system is configured to adjust a target temperature after turbine of a temperature after turbine control function to lower the target temperature after turbine, in further response to the load of the gas turbine system decreasing to the first partial load.

6. The combustor system of claim 4, wherein the control system is further configured to, in response to a variable inlet guide vane (VIGV) position reaching an adjustment limit and the load of the gas turbine system further decreasing to a second partial load lower than the first partial load, activate one or both of: the first single burner control valve and the flow limiter, wherein the load decreasing to the second partial load causes at least one of the following:
   the turbine inlet temperature (TIT) decreasing to a second TIT set point,
   the combustor pulsation value increasing to a second pulsation set point, or
   the emission value exceeding the second emission limit.

7. The combustor system of claim 1, wherein the predetermined emission limit includes a first emission limit and a second emission limit, and the control system is further configured to, in response to a variable inlet guide vane (VIGV) position not reaching an adjustment limit and the load of the gas turbine system decreasing to a second partial load lower than a first partial load, activate one or both of: the first single burner control valve and the flow limiter, wherein the load decreasing to the second partial load causes an emission value of the gas turbine system to exceed one or both of the first and the second emission limits.

8. The combustor system of claim 4, wherein the control system is configured to, in response to the load of the gas turbine system increasing, deactivate at least one of: the at least one burner group control valve, the first single burner control valve, or the flow limiter, wherein the load increasing causes at least one of the following: the turbine inlet temperature (TIT) increasing to exceed the first TIT set point, the turbine inlet temperature (TIT) increasing to exceed a second TIT set point, the combustor pulsation value decreasing to below the first pulsation set point, the combustor pulsation value decreasing to below a second pulsation set point, the emission value decreasing to below the first emission limit, or the emission value decreasing to below the second emission limit.

9. The combustor system of claim 1, wherein the load decreasing includes the load decreasing to a load of less than 50%.

10. A control system, the control system configured for a combustor system of a gas turbine system comprising plurality of burners, each burner of the plurality of burners including an inflow region for receiving a combustion air flow and a corresponding mixing zone disposed downstream of the inflow region for receiving the air flow and a fuel flow, the control system comprising:
  a computerized controller operatively coupled to:
    a combustion sensor configured to determine a combustion parameter within a combustion chamber of the combustor system,
    an exhaust sensor configured to determine an exhaust parameter of exhaust exiting the gas turbine system, and
    a fuel flow vale system disposed to control the fuel flow received in the corresponding mixing zone of each burner of the plurality of burners of the combustor system,
  wherein the computerized controller is configured to, in response to a load of the gas turbine system decreasing, perform a redistribution of the fuel flow received in the corresponding mixing zone of at least one burner of the plurality of burners as a function of a predetermined emission limit, and
  wherein the fuel flow vale system includes:
    a first flow control structure that includes at least one burner group control valve, the at least one burner group control vale disposed to turn off the fuel flow received in the corresponding mixing zones of a selected group of the plurality of burners in order to perform the redistribution;
    a second flow control structure that includes a first single burner control valve, the first single burner control valve disposed to turn off the fuel flow received in the corresponding mixing zone of a first selected single burner of the plurality of burners in order to perform the redistribution, and
    a third flow control structure that includes a second single burner control valve operatively coupled to a flow limiter, the flow limiter disposed to selectively limit the fuel flow received in the corresponding mixing zone of a second selected single burner of the plurality of burners to a predetermined value in order to perform the redistribution, and
    wherein the first single burner control valve is not operatively coupled to the flow limiter.

11. The control system of claim 10, wherein the combustion parameter includes a combustor pulsation value, and the exhaust parameter includes at least one of: a temperature after turbine (TAT) and an emission value of the gas turbine system.

12. The control system of claim 10, wherein the computerized controller controls the fuel flow received in the corresponding mixing zone of the at least one burner as a function of a temperature after turbine control function that controls a temperature after turbine (TAT),
  wherein the temperature after turbine control function is responsive to at least one of: a turbine inlet temperature (TIT), a compressor inlet temperature of a compressor of the gas turbine system (TK1), and a variable inlet guide vane (VIGV) position that controls an air flow from the compressor.

13. The control system of claim 10, wherein the predetermined emission limit includes a first emission limit and a second emission limit, and
  wherein the computerized controller is configured to, in response to the load of the gas turbine system decreasing to a first partial load, activate the at least one burner group control valve, wherein the load decreasing to the first partial load causes at least one of the following:
    a turbine inlet temperature (T) decreasing to a first TIT set point,
    a combustor pulsation value increasing to a first pulsation set point, or
    an emission value of the gas turbine system exceeding the first emission limit.

14. The control system of claim 13, wherein the computerized controller is configured to adjust a target temperature after turbine of a temperature after turbine control function to lower the target temperature after turbine (TAT), in further response to the load of the gas turbine system decreasing to the first partial load.

15. The control system of claim 13, wherein the computerized controller is further configured to, in response to a variable inlet guide vane (VIGV) position reaching an adjustment limit and the load of the gas turbine system further decreasing to a second partial load that is lower than the first partial load, activate one or both of: the first single burner control valve and the flow limiter, wherein the load decreasing to the second partial load causes at least one of the following:
    the turbine inlet temperature (TIT) decreasing to a second TIT set point,
    the combustor pulsation value increasing to a second pulsation set point, or
    the emission value exceeding the second emission limit.

16. The control system of claim 10, wherein the predetermined emission limit includes a first emission limit and a second emission limit, and the computerized controller is further configured to, in response to a variable inlet guide vane (VIGV) position not reaching an adjustment limit and the load of the gas turbine system decreasing to a second partial load that is lower than a first partial load, activate one or both of: the first single burner control valve, and the flow limiter, wherein the load decreasing to the second partial load causes an emission value of the gas turbine system to exceed one or both of the first and the second emission limits.

17. The control system of claim 13, wherein the computerized controller is further configured to, in response to the load of the gas turbine system increasing, deactivate at least one of: the at least one burner group control valve, the first single burner control valve, or the flow limiter, wherein the load increasing causes at least one of the following:

the turbine inlet temperature (TIT) increasing to exceed the first TIT set point, the turbine inlet temperature (TIT) increasing to exceed a second TIT set point, the combustor pulsation value decreasing to below the first pulsation set point, the combustor pulsation value decreasing to below a second pulsation set point, the emission value decreasing to below the first emission limit, or the emission value decreasing to below the second emission limit.

\* \* \* \* \*